Patented June 8, 1943

2,321,384

UNITED STATES PATENT OFFICE 2,321,384

COMPOUND FOR SEALING AND LUBRICATING RELATIVELY MOVING PARTS

Herman W. Hemker, Cleveland, and Robert C. Fuhrman, Mentor, Ohio, assignors to Arthur L. Parker, Cleveland, Ohio No Drawing. Application March 31, 1941, Serial No. 386,178

4 Claims. (Cl. 252—36)

This invention relates to a composition for employment with plug valves or other structures having relatively moving parts, and is effective for lubricating the parts to facilitate their movement and for sealing these parts against leakage of gasoline, oil, water, and like fluids.

A presently preferred composition comprises the following ingredients and proportions:

| | Parts |
|---|---|
| Blown castor oil | 258 |
| Calcium soap of blown castor oil | 10 |
| Fused lead stearate | 50 |
| Saponified wax | 35 |
| Aniline | 3 |

The blown castor oil is a highly oxidized and polymerized castor oil which has been subjected to such treatment by heat and air or oxygen until it has lost solubility in gasoline or oil and has become substantially stabilized against later deterioration from atmospheric influences by way of oxidation or the like. It has been found in practice that the type of blown castor oil known commercially as "Hydronamic Pale 4A" is excellently adapted for employment.

The calcium soap of blown castor oil can be prepared by taking 100 parts of the aforesaid "Hydronamic Pale 4A" castor oil and working the same with a smooth paste consisting of 8.9 parts of calcium oxide and 50 parts of water, the stirring being continued until a smooth and uniform mixture results. During the course of the reaction, bubbles of steam escape. At the composition of the reaction, this escape of steam bubbles ceases, and the mixture is a clear, very viscous, dark brown mass which is free of any small white lumps. The mixture is then heated with the stirring until the water is essentially eliminated.

The saponified wax is preferably prepared from commercial wax which consists of the mixture of one part of beeswax and two parts of #1 yellow carnauba wax. Saponification is effected by mixing with 17.9 parts of caustic soda (in aqueous solution in as little water as possible) for every 300 parts of the wax, slowly introducing the caustic solution with slow stirring into the melted wax. The reaction is very rapid, and the stirring and introduction of caustic should be regulated to prevent the mixture from boiling over. Upon completion of the mixture, heating is continued, with stirring, until all of the water has been drawn off, as indicated by the cessation of escape of bubbles. The saponified wax is a viscous dark-green liquid, almost black in color, and upon cooling it becomes a hard greenish brown solid which can then be broken or ground into small lumps or particles.

The fused lead stearate is prepared by reacting molecularly equivalent quantities of (bivalent) lead oxide and stearic acid to produce a fused mass of substantially neutral reaction. This mass is then comminuted.

The ingredients are blended by stirring the saponified wax into the blown castor oil, and heating to approximately 360 degrees F., with stirring, until all solid lumps have disappeared. The calcium soap and the fused lead stearate are next added in comminuted form, with stirring until a smooth mixture is obtained. This product is then allowed to cool to about 250 degrees F., and the aniline is introduced with stirring. This liquid product is then poured into suitable containers and permitted to cool to room temperature.

A thin film of this lubricating and sealing material can be applied to a plug cock before assembling a plug valve, and serves as a seal during the normal operation of the valve, and permits the valve to be opened and closed without difficulty by way of sticking.

It is preferred to employ an alkaline earth soap of blown castor oil, illustratively the calcium soap of the above formula, as such soap is more resistant to gasoline and oil than the ordinary castor oil, and confers valuable aging qualities on the composition: the alkaline earth soaps have better adherence than sodium or potassium soaps, and are more insoluble in gasoline, oil and water than such alkali metal soaps. From 5 to 15 parts of the soap can be employed.

The carnauba wax and beeswax should each be refined products, in order to eliminate contamination by impurities from the raw waxes. They are employed to afford excellent resistance to solution by gasoline and oil, lubrication in the composition set out, and satisfactory resistance to wear. The saponified carnauba wax has better gasoline and oil resistance than saponified beeswax, but the mixture of the two gives a satisfactory composition at a lesser cost than that of carnauba wax alone; however, it has been found that satisfactory compositions for many employments can be produced with saponified beeswax alone. The sodium soap has been preferred, although potassium or alkaline earth soaps, such as the calcium soap, can be used to provide a composition which is stiffer and hence less advantageous particularly at the low temperatures, when used alone. Mixture of such soaps can be employed. From 30 to 40 parts of saponified wax have been found advantageous for conferring the desired properties.

The fused lead stearate has been found to provide a smoother and more uniform product than aluminum or zinc stearates in powdered form. Powdered as distinguished from fused lead stearate often causes excessive foaming and frothing during the procedure of producing the lubricant, with attendant difficulties, considering the high temperature employed: whereas the fused lead stearate does not cause foaming or frothing, and appears to provide a better blending into the composition. Neither zinc nor aluminum stearate can be satisfactorily prepared in fused form, due to certain decompositions or changes of characteristic in the course of the fusion. From 40 to 70 parts of fused lead stearate may be utilized.

The preferred employment of aniline in an illustration of the use of an organic amine as a stabilizer for maintaining the desired characteristics against aging influences. It has been found that the addition of a small amount of such an agent may give more than eight times the effective life or resistance to aging influences. From 2 to 4 parts of aniline, or corresponding quantities of other stabilizers, can be utilized.

It will be understood that the invention is not limited to the examples of practice set out above, but that it may be employed in many ways within the scope of the appended claims.

We claim:

1. A lubricating and sealing composition for metal parts which must move in contact with gasoline, oil, water and like liquids, comprising substantially 258 parts by weight of blown castor oil, 5 to 15 parts by weight of alkaline earth soap of blown castor oil, 30 to 40 parts of saponified wax selected from the group consisting of waxes saponified with alkali and earth alkali bases, and 40 to 70 parts of fused lead stearate.

2. A lubricating and sealing composition for metal parts which must move in contact with gasoline, oil, water and like liquids, comprising 258 parts by weight of oxidized and polymerized blown castor oil, substantially 10 parts of neutral calcium soap of blown castor oil, substantially 35 parts of a neutral saponified mixture of carnauba wax and beeswax, and substantially 50 parts of fused lead stearate.

3. A lubricating and sealing composition as in claim 1, including substantially 2 to 4 parts of an aromatic amine as a stabilizer.

4. A lubricating and sealing composition as in claim 2, including two or four parts of aniline.

HERMAN W. HEMKER.
ROBERT C. FUHRMAN.